March 2, 1965 W. E. PARKES ETAL 3,171,211
DRY FILM SCRATCH GAGE
Filed May 20, 1963
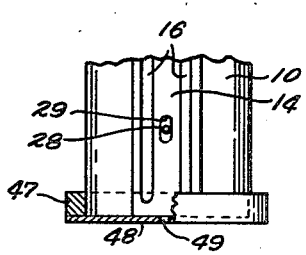
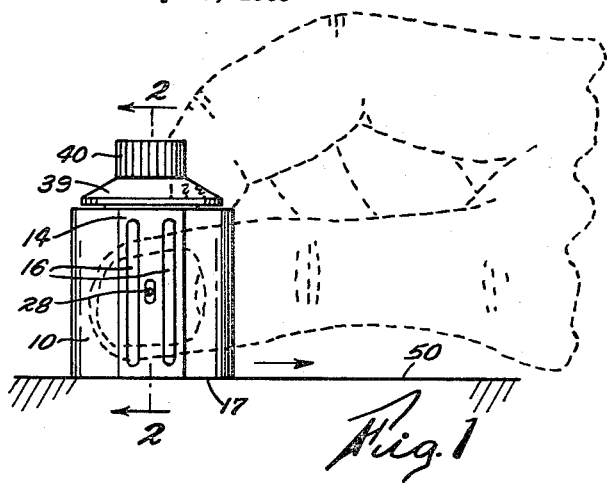
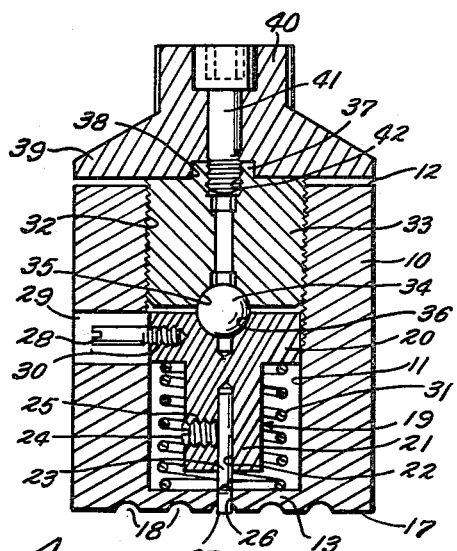
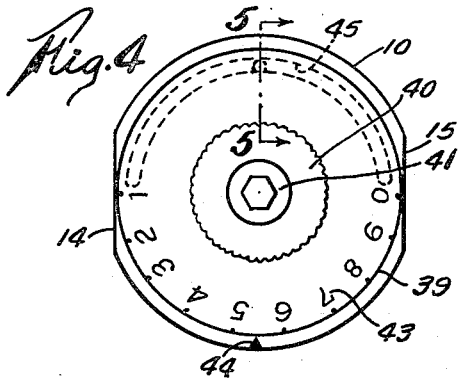
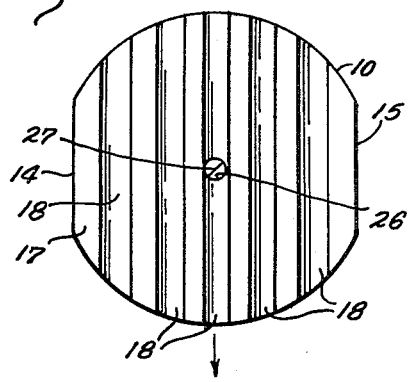
INVENTORS
Walter E. Parkes
William W. Parkes
Maynard R. Euverard
BY
ATTY.

United States Patent Office 3,171,211
Patented Mar. 2, 1965

3,171,211
DRY FILM SCRATCH GAGE
Walter E. Parkes and William W. Parkes, both of 3758 Montgomery Road, Cincinnati 12, Ohio, and Maynard R. Euverard, Richmond Va. (% Walter E. Parkes, 3758 Montgomery Road, Cincinnati 12, Ohio)
Filed May 20, 1963, Ser. No. 281,411
7 Claims. (Cl. 33—170)

This invention relates to improvements in dry film thickness gages and is particularly directed to a precision scratch gage for measuring the thicknesses of dried coatings or films that have been applied to the surfaces of wood, plastic, metal, and the like.

It is an important object of the invention to provide a small and compact gage that may be readily carried on the person and which has a planar, measurement reference surface and a novel film penetrating needle axially projectable at right angles from the reference surface; the gage having an improved manually actuable micrometer means for the recordation of positive and precisely accurate readings of the film thickness penetrated by the needle.

Another object of the invention is to provide a dry film scratch gage that has a novel drawing action as it is manually slid over the surface of the dry film to insure accurately measurable needle penetration of said film.

A further object of this invention is to provide in a gage having the foregoing characteristics a manually actuable micrometer means for operating the needle means which secures positive retraction of the needle so that the gage can be turned back to a desired new setting without the necessity of turning the gage back beyond the new setting and then advancing the gage to said setting, as is the case with conventional micrometer gages.

Other and still further objects of the invention will be apparent from the following specification, taken in conjunction with the accompanying drawings which illustrate a preferred embodiment of our invention, and wherein:

FIG. 1 is a side elevational view of our dry film thickness gage shown in operative, measuring position.

FIG. 2 is a enlarged section taken on line 2—2 of FIG. 1.

FIG. 3 is a bottom plan view of the gage as it is illustrated in FIG. 2.

FIG. 4 is a top plan view of the gage as it is shown in FIG. 2.

FIG. 5 is a section taken on line 5—5 of FIG. 4.

FIG. 6 is a fragmental view of our gage associated with a checking shim therefor, parts of the shim being broken away and shown in central section.

Referring now to the drawings, the numeral 10 depicts a hollow, cylindrical gage body having a large, concentric blind end bore 11 formed therein to provide a gage body that has an open upper end 12 and a lower end closed by an integral bottom wall 13. The exterior cylindrical face of the gage is provided with a pair of diametrically opposed flat surface portions 14 and 15 which, as illustrated in FIG. 1, serve as finger engaging means for securely holding the gage in operative measuring position; each flat portion having formed therein upstanding groves 16 which provide friction gripping means between the gage body and the operator's fingers. As best shown in FIGS. 2 and 3, the exterior surface 17 of the bottom wall 13 lies in a plane normal to the axis of the gage body and is provided with a number of parallel grooves 18 having their longitudinal center lines disposed parallel to the planes of the diametrically opposed flat surface portions 14 and 15 of the gage body. This exterior surface 17 of the bottom wall 13 functions as a planar, measurement reference surface for the gage and it will be understood that when the gage is manually moved in the direction of the arrows in FIGS. 1 and 3 that the measurement reference surface will be flush with the flat exterior surface of a dry film and will be readily guided and slidable over said surface with a smooth rectilinear motion.

Slidably mounted within the lower portion of the bore 11 of the body there is positioned for rectilinear vertical motion a follower means generally indicated by the reference numeral 19. As illustrated in FIG. 2 the follower has an upper collar portion 20 that fits snugly within the bore 11 and with a steam portion 21 depending from, and concentric with, said collar portion 20. A concentric bore 22 is formed through the bottom part of the stem portion to receive the upper portion of a measuring needle 23; a set screw 24 being threaded in a tapped bore 25 formed laterally in the stem portion to fixedly mount the needle in adjusted vertical positions on the stem. The lower projected portion of the needle extends snugly through a concentric bore 26 formed in the bottom wall 13 of the gage body, the said lower needle end being provided with a sharp edge 27 which is transverse to the axis of the needle, and, as illustrated in FIG. 3, is positioned at an angle of 45° with respect to the longitudinal center lines of the grooves 18 in the measurement reference surface 17 of the gage body. The follower means is precluded from rotational movement in the gage body and in guided for rectilinear, vertical movement therein by a pin 28 that projects from the follower means into a vertical slot 29 formed in the gage body, the inner end of the pin being threaded in a tapped bore 30 formed in the collar portion 20 of the follower 19. A strong, expansile spring 31 encircles the stem portion 21 of the follower means and bears at its upper end against the collar portion 20 of said follower means, the lower portion of the spring bearing against the interior surface of the bottom wall 13 of the gage body 10.

The upper half of the interior wall of the bore 11 is provided with very fine, micrometer threads 32 which cooperate with an exteriorly threaded barrel 33 to provide minute vertical axial movement of the barrel in the gage body upon relative rotation of the barrel on its axis. A rotatable connection is provided between the micrometer barrel 33 and the follower means 19 comprising a concentric ball bearing 34 disposed concentrically between the confronting faces of the follower means 19 and the micrometer barrel 33. A spherical seat 35 having the same diameter as the ball bearing 34 is formed concentrically in the lower face of the barrel 33 to receive the ball while the collar 20 on the follower means 19 is provided with a similar concentric ball receiving seat 36 in its upper face.

The upper end of the collar is provided with a concentric lug 37 that is received in a socket 38 formed in the lower face of a dial 39, the upper end of the dial having a knob portion 40 with a knurled periphery to provide good manual gripping action between the knob and the fingers. An "Allen" head screw 41 extends through the central part of the dial and is threaded in a tapped bore 42 in the barrel 33 to adjustably fix the knob to the barrel. The periphery of the dial is calibrated at 43 (FIG. 4) and the calibrations are referred to a witness mark 44 inscribed in the upper face of the gage body 10 to indicate the positions of the needle. A concentric circular groove 45 (FIGS. 4 and 5) is formed in the bottom face of the dial 39 into which the projected end of a stop pin 46 projects, said pin being fixed in the upper face of the gage body 10. Thus the groove and pin arrangement limits rotation of the dial through 180° which is substantially the angular extension of the calibrations on the dial.

As illustrated in FIG. 6 a checking shim may be provided for the gage shown in FIGS. 1–5, said shim comprising a metal ring 47 which snugly engages the lower exterior portion of the gage body; the ring having a membrane 48 fixed thereto, and the membrane having a concentric hole 49 formed therein through which the needle 23 may project. The membrane has a thickness of substantially .005″ it being understood that to check the gage the dial should also be set at the calibration numbered 5″ with respect to the witness mark 44 and at that point, when the gage is correct for usage, the terminal end of the needle should be flush with the exterior face of the shim. Such condition may be verified by moving the gage so set with the shim in position over a flat surface without producing a visible mark on said surface, whilst an advance of the dial of a fraction of a setting will create a visible mark on said surface.

In operation the dial of the gage is first moved to a calibration judged by the operator to correspond to the thickness of the dry film to be measured. As has been indicated each calibration 43 on the dial 39 represents one-thousandths of an inch of axial movement of the needle 24 relative to the measurement reference surface; and therefore if it is judged that the dry film thickness is two-thousandths of an inch the numeral "2" on the dial would be set opposite the witness mark 44 and thereafter the gage is held in the manner shown in FIG. 1 of the drawings with the planar measurement reference surface 17 held firmly upon the dry film 50 to be measured. Then with a firm even motion the gage is slid over the surface of the dry film 43, the sharp terminal edge 27 of the needle 23 being moved across and through the dry film at an angle of 45° to the direction of movement of the gage. A scratch will be formed in the dry film and from the nature of the scratch so formed the operator can judge whether the needle had penetrated too deeply or not deep enough into the dry film to be measured. In the event the initial scratch appears too deep the needle will be retracted by turning the dial back say one-thousandth of an inch, or, if the said scratch appears to have not penetrated deep enough the dial will be advanced one-thousandth and another scratch made, said procedure being followed until an exact and satisfactory scratch is created in the film whereafter a reading is taken from the dial that will accurately record the thickness of the dry film.

Having thus described our invention what we claim is:

1. In a scratch gage for measuring the thickness of a dry film, the combination of a cylindrical body having an external measurement reference surface on the bottom thereof disposed in a plane normal to the body axis, a follower mounted for rectilinear, axial movement within the lower portion of the body, a manually actuable micrometer barrel threaded in the upper portion of the body, a rotatable connection between the micrometer barrel and the follower for operating the follower toward and away from the bottom, dial means associated with the micrometer barrel, a needle adjustably mounted on the follower and having its lower pointed end portion projectable beyond the measurement reference surface, and an expansile spring having one end bearing against the follower and its opposite end bearing against the bottom of the body.

2. In a scratch gage for measuring the thickness of a dry film, the combination of a hollow, cylindrical body having an external measurement reference surface on the bottom thereof disposed in a plane normal to the body axis, a follower mounted for rectilinear, axial movement within the lower portion of the body, said follower having an upper collar portion and a lower stem portion, a manually actuable micrometer barrel threaded in the upper portion of the body, a rotatable connection between micrometer barrel and the collar portion of the follower for operating the follower toward and away from the bottom, dial means associated with the micrometer barrel, a needle adjustably mounted on the follower and having its lower pointed end portion projectable beyond the reference surface, and an expansile spring surrounding the stem portion of the follower, said spring having one end bearing against the collar portion of the follower and its opposite end bearing against the bottom of the body.

3. In a scratch gage for measuring the thickness of a dry film the combination of a cylindrical gage body having external, diametrically opposed and parallel finger gripping surfaces on the body, an external measurement reference surface on the bottom of the body disposed in a plane normal to the axis of the body, a series of elongated grooves formed in the measurement reference surface, the longitudinal center lines of said grooves extending in the general directions of the finger gripping faces on the body, follower means axially movable within the body, a manually actuable micrometer means for axially moving the follower means in the body, dial means associated with the micrometer means, and a needle mounted on the follower means and having its lower portion projectable beyond the measurement reference surface, said needle having a sharp terminal edge disposed at an acute angle with respect to the longitudinal dimension of the grooves in said measurement reference surface.

4. In a scratch gage for measuring the thickness of a dry film, the combination of a cylindrical gage body having planar, diametrically opposed and parallel finger gripping surfaces formed on the external wall thereof, a planar measurement reference surface on the external bottom side of the gage body, said measurement reference surface being disposed in a plane normal to the finger gripping surfaces, a series of straight, parallel grooves formed in the measurement reference surface, the longitudinal center lines of said grooves being parallel to the planes of the finger gripping surfaces of the body, follower means mounted for axial, rectilinear movement within the gage body, a manually actuable micrometer means in the body connected to the follower means, dial means associated with the micrometer means, and a needle mounted coaxially on the follower means and having its free end projected through and beyond the measurement reference surface, said needle having a sharp edge transverse to its axis and positioned at an acute angle with respect to the longitudinal center lines of the grooves in said measurement reference surface.

5. In a scratch gage for measuring the thickness of a dry film, the combination of a cylindrical gage body having a concentric, blind end bore formed therein to provide an open upper end and a closed bottom for the body, a planar measurement reference surface on the external side of the bottom of the gage body, internal micrometer threads formed in the upper portion of the bore, an externally threaded barrel cooperable with the micrometer threads in the bore, a manually actuable measurement recording dial fixed to the upper end of the barrel, a follower means mounted for axial, rectilinear movement in the bottom of the bore, opposed spherical seats formed in each of the adjacent faces of the barrel and the follower means, a ball bearing in the seats, an expansile spring bearing against the follower means and against the bottom of the gage body, and a needle mounted coaxially on the follower means and having its lower end projected through and beyond the measurement reference surface, the axis of the needle being normal to the plane of said surface.

6. In a scratch gage for measuring the thickness of a dry film, the combination of a cylindrical gage body having a concentric, blind end bore formed therein to provide an open upper end and a closed bottom end for the body, a planar measurement reference surface on the external portion of the bottom of the gage body, internal micrometer threads formed in the upper portion of the bore, an externally threaded barel cooperable with the micrometer threads in the bore, a manually actuable measurement recording dial fixed to the upper end of the barrel, a follower means mounted for axial, rectilinear movement in the bottom of the bore, said follower having an upper collar portion fitted snugly in the bore and a lower stem portion concentric with the collar portion, opposed spherical seats formed centrally in each of the adjacent faces of the barrel and the collar portion of the follower means, a ball bearing in the seats, an expansile spring encircling the stem portion of the follower means and having its upper end bearing against the collar portion and its lower end bearing against the internal face of the bottom of the gage body, and a needle means mounted coaxially on the stem portion of the follower means and having its lower end portion projected through and beyond the measurement reference surface, the needle having a sharp lower edge disposed laterally of the needle axis.

7. In a scratch gage for measuring the thickness of a dry film, the combination of a cylindrical gage body having a concentric blind end bore formed therein to provide an open upper end and a closed bottom end for the body, a planar measurement surface formed on the external side of the bottom end of the body, a series of laterally spaced, parallel grooves formed in the side surface, the intermediate groove of said series having its longitudinal center line lying in the axis of the bore in the body, a hole formed through the bottom end of the body and having its axis intersecting the center line of said intermediate groove, and coaxial with the bore in the body, internal micrometer threads formed in the upper portion of the bore, an externally threaded barrel disposed in the upper end of the bore and cooperable with the micrometer threads therein, a manually actuable measurement recording dial fixed to the upper end of the barrel, a follower means mounted for axial, rectilinear movement within the bottom of the bore, said follower having an upper collar portion fitted snugly in the bore and a reduced, lower stem portion, concentric with and depending from the collar portion, opposed, semi-spherical seats formed centrally in vertically spaced, confronting faces of the barrel and the collar portion of the follower means, a ball bearing in the said seats, an expansile, spiral spring encircling the stem portion of the follower means and having its upper end bearing against the collar portion of the follower means and its lower portion bearing against the internal face of the bottom end of the gage body, and a needle mounted coaxially on the lower end of the stem portion of the follower means and having its lower end portion projecting through the hole in the bottom end of the gage body, the needle having a sharp lower tansverse edge axially movable in and beyond the intermediate groove, said edge being disposed at an acute angle with respect to the center line of said groove.

References Cited by the Examiner
UNITED STATES PATENTS
2,269,616   1/42   Yuhase _____ 33—170

ISAAC LISANN, *Primary Examiner.*